(12) United States Patent
Smith et al.

(10) Patent No.: US 8,574,646 B2
(45) Date of Patent: Nov. 5, 2013

(54) PACKAGE FOR MOLDED FOOD PRODUCT

(75) Inventors: David Smith, Needham, MA (US);
David Riemersma, Jenison, MI (US);
Mark Peters, Grand Rapids, MI (US);
Kevin Keough, Canton, MA (US)

(73) Assignee: Lion Rock Licensing Corp., Grand Rapids, MI (US)

( * ) Notice: Subject to any disclaimer, the term of this patent is extended or adjusted under 35 U.S.C. 154(b) by 221 days.

(21) Appl. No.: 12/899,896

(22) Filed: Oct. 7, 2010

(65) Prior Publication Data
US 2011/0020505 A1 Jan. 27, 2011

Related U.S. Application Data

(62) Division of application No. 11/894,332, filed on Aug. 21, 2007, now Pat. No. 7,829,131.

(51) Int. Cl.
*A23B 7/148* (2006.01)

(52) U.S. Cl.
USPC ........... 426/112; 426/106; 426/130; 426/389; 426/383; 426/515; 426/581; 220/530

(58) Field of Classification Search
USPC ......... 426/115, 104, 383, 515, 130, 389, 512, 426/385, 89
See application file for complete search history.

(56) References Cited

U.S. PATENT DOCUMENTS

| | | | |
|---|---|---|---|
| 3,183,101 A | 5/1965 | Peters | |
| 3,317,326 A | 5/1967 | Peters | |
| 3,360,382 A * | 12/1967 | Miller | 426/316 |
| 3,398,000 A | 8/1968 | Peters | |
| 3,798,335 A | 3/1974 | Peters | |
| 3,865,953 A | 2/1975 | Peters | |
| 3,896,239 A | 7/1975 | Peters | |
| 3,901,000 A | 8/1975 | Peters | |
| 3,976,796 A * | 8/1976 | Peters | 426/115 |
| 6,793,193 B2 | 9/2004 | de Groote | |
| 2004/0185152 A1* | 9/2004 | Garwood | 426/383 |

OTHER PUBLICATIONS

PETG NPL, Aug. 16, 2000, http://www.polymerplastics.com/transparents_petg.shtml.*
Butterball Farms, Inc., Our Mission Statement. Date: N. A.
Butterball Farms, Inc., Tip-Out Pack E-Z Serve Tray. Date: N. A.
Butterball Butter, Easy Out. Easy In. Date: N. A.

* cited by examiner

*Primary Examiner* — Drew Becker
*Assistant Examiner* — Preston Smith
(74) *Attorney, Agent, or Firm* — McGarry Bair PC

(57) ABSTRACT

A solid food product is molded in a mold cavity and is thereafter packaged in the mold cavity. The mold cavity is formed in a sheet and includes a side wall which extends from the sheet and a bottom wall which includes an inverting portion which extends from said side wall and a central portion. The central potion of the bottom wall includes a plurality of ridges which form a decorative design. A liquid food product is introduced into the mold cavity and allowed to solidify to form a molded solid food product. The central portion of the bottom wall is thereafter pushed into the mold cavity to invert said inverting potion and to push the molded food product away from the central portion of the bottom wall. The molded food product includes ridges which correspond to the ridges in the bottom wall of the mold cavity. A lid is attached to the sheet to enclose and package the molded food product within the mold cavity.

19 Claims, 6 Drawing Sheets

PACKAGE FOR MOLDED FOOD PRODUCT

RELATED APPLICATION

This application is a division of application entitled Package for Molded Food Product and Method, U.S. Pat. No. 7,829,131, issued Nov. 9, 2010.

BACKGROUND

This invention relates to molded food products, and, more particularly, to a package for a molded food product which is used to mold the food product and subsequently to package the food product.

Many food products are molded with a decorative design on the outer surface thereof. For example, U.S. Pat. Nos. 3,183,101, 3,317,326, 3,398,000, 3,798,335, 3,865,953, 3,896,239, 3,901,000, and 3,976,796 describe butter or margarine products with an embossed or raised design on the upper surface. The butter or margarine can be quarter pound or larger bulk servings or can be smaller pats which are sized for individual servings. Many other food products may be molded with a decorative design, for example, chocolate and cheese.

U.S. Pat. No. 3,798,335 describes a process for filling molds with liquid butter or margarine. In accordance with current practice, after the molds are filled, the butter or margarine is frozen. The frozen product is removed from the mold by "punching" or pressing the outside of the mold cavity so that the mold is turned inside out and the frozen product is ejected or dispensed onto a tray or plastic sheet.

The ejected embossed butter or margarine pats can be packaged for shipping to the customer in several ways. Individual pats can be loaded into a tray of the type which is described in U.S. Pat. No. 3,896,239. Alternatively, after the embossed pats are ejected onto a tray, a package with pockets for the pats can be placed over the pats. The tray is then inverted to drop the pats into the pockets, and a lid or cover can be positioned over the pats.

Individual embossed pats can also be loaded into individual packages. See, for example, U.S. Pat. Nos. 3,865,953, 3,901,000, and 3,976,796. Butterball Farms, Inc. of Grand Rapids, Mich. markets individual pats in clear plastic packages called "Tip-Out" packs. Each pat is individually sealed in a pocket in a plastic package, and the pocket is covered by a plastic film. At the point of consumption, the consumer peels off the film and tips out the pat, embossed side up.

The foregoing packaging processes suffer from a number of disadvantages. For example:

The molds are used once and are disposed of after the pats are removed.

The process for punching out the pats and inserting them into a package is labor intensive and expensive.

If the pats become too warm, the pats can fall prematurely from the molds.

Locating the molds before ejecting the pats and locating the packages over the pats is done by eye by the operator and may be inaccurate.

In one current practice the plastic tray which is used to mold multiple pats of butter or margarine is also used to ship the pats after they are frozen. The mold cavities may be vacuum formed in thin plastic film, e.g., PETG, which is about 0.0025 inch thick. Trays which are used to mold and ship the pats are intended to be used by the institutional customer which purchases the pats, for example, a restaurant. Such a customer punches out the pats onto a plate in a kitchen or preparation area and then places individual pats onto serving plates for the consumer, for example, a restaurant patron.

This process also suffers from a number of disadvantages:

The bottoms of the mold pockets of the package are concave, and the package may be somewhat unstable when it rests on the concave pockets.

The pats are not loose in the package and must be ejected after shipment.

The pats must be within a certain temperature range in order to be ejected cleanly, and proper ejection technique must be followed. Many institutional customers do not exercise proper temperature control and/or ejection techniques, and pats can be damaged or ruined during ejection.

The package contains multiple pats and is not used for individual servings.

SUMMARY OF THE INVENTION

In accordance with the invention, a mold cavity both molds the food product and forms the package for the product. The mold cavity is formed from a plastic sheet and includes a side wall and a bottom wall. The bottom wall includes ridges or peaks and valleys which form the decorative design on the product. The bottom wall is constructed so that it can be pushed into the mold cavity after the product is molded to eject the product from the mold cavity. Preferably, the bottom wall includes a generally frusto-conical inverting portion and a central portion which includes the peaks and valleys. The pushing step inverts the inverting portion as the central portion moves into the mold cavity. The bottom wall advantageously remains in the pushed-in condition when the mold cavity serves as the package.

Product such as liquid butter or margarine is dispensed into the mold cavity and then solidified by refrigerating or freezing. After the product is solidified, the bottom wall of the mold cavity is pushed in or punched so that the bottom wall moves into the mold cavity and the product is released from the surface of the mold cavity. The bottom wall remains in its punched condition, and the pat can sit freely on the bottom wall. A thin plastic film or lid is attached to the sheet to enclose the product for shipping. Each mold cavity includes a single product.

The inventive package provides several advantages over the prior art:

The disposable mold film is eliminated, saving the cost of purchasing, handling, and disposing of the film.

The punching operation is performed at the factory using proper technique and under proper temperature conditions.

The step of transferring the products from the molds into separate packages is eliminated, significantly reducing production labor.

The package is molded with the decorative design, substantially enhancing its outside appearance.

The punched-in bottom wall of the mold cavity provides a more stable support if the package is supported by the bottom wall.

The expense of separate containers or trays is eliminated.

The mold/package can be formed individually so that each package holds a single product. Alternatively, multiple molds can be formed in a single sheet of material. After the products are molded and frozen, each individual mold/package can be cut from the sheet and shipped as an individual package with a single product, or the entire sheet can be shipped with multiple products.

DESCRIPTION OF THE DRAWING

The invention will be explained in conjunction with illustrative embodiments shown in the accompanying drawing, in which.

DESCRIPTION OF SPECIFIC EMBODIMENTS

Figure 1:
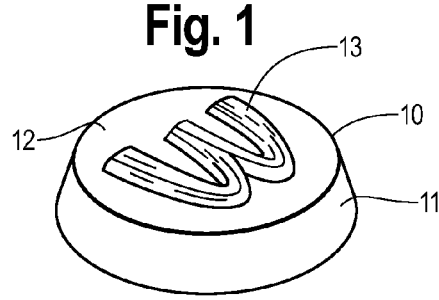
FIG. 1 is a perspective view of an embossed food product such as a butter or margarine pat which is molded and packaged in accordance with the invention.

FIG. 1 illustrates an embossed food product 10. The particular food product is a butter pat which is sized as an individual serving, for example, about 0.2 ounce. However, the invention is suitable for use with other food products, for example, margarine, chocolate, cheese, and the like, and other sizes, for example, ¼ pound or larger.

The pat 10 is generally round and includes a bottom surface on which the pat rests, a frusto-conical side surface 11, and a top surface 12. A design 13 is embossed or raised from the top surface. The particular design illustrated is the letter "m," but the designs are unlimited.

Although the invention is particularly suitable for products with an embossed or raised design, the invention can also be used with products having a lowered or grooved or engraved design on the top surface or a combination embossed and engraved design.

Figure 2:
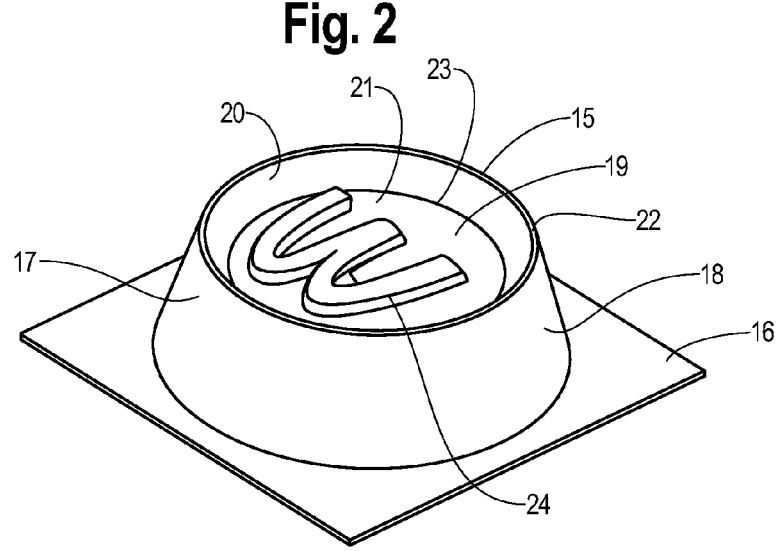
FIG. 2 is a bottom perspective view of the mold for forming the food product of FIG. 1, the bottom wall of the mold being in its pushed-in condition.
Figure 3:
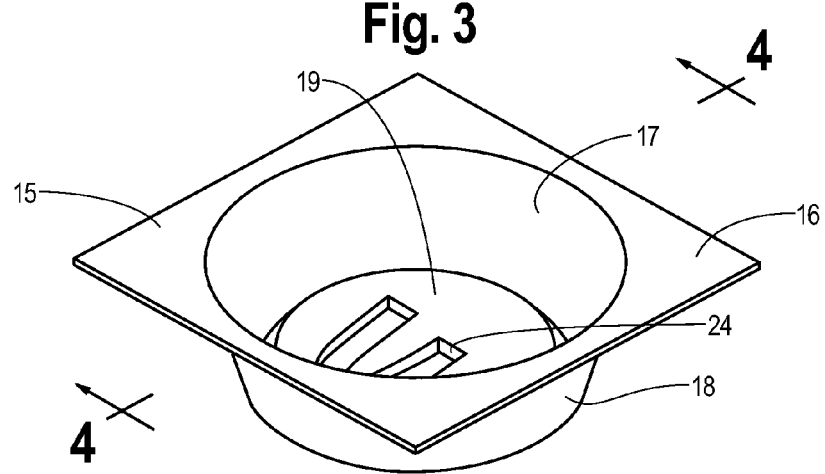
FIG. 3 is a top perspective view of the mold of FIG. 2.
Figure 4:
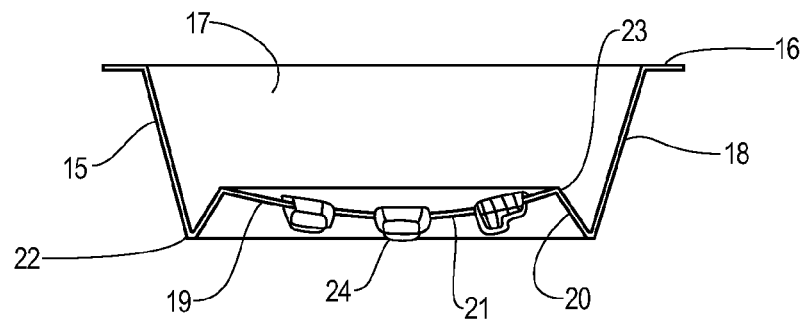
FIG. 4 is a sectional view of the mold taken along the line 4-4 of FIG. 3.

FIGS. 2-4 illustrate the mold/container 15 for the pat 10. The mold is formed from a plastic sheet having a thickness within the range of about 0.008 to about 0.025 inch. Suitable plastics include polystyrene, oriented polystyrene (OPS), styrene butadiene styrene (SBS), PET, and PETG. One specific embodiment was formed from PETG having a thickness of 0.015 inch.

The mold 15 includes a generally flat flange 16 and a generally cup-shaped pocket or cavity 17 which is formed by a frusto-conical side wall 18 and a bottom wall 19. The side wall can also be a portion of a sphere or some other suitable shape, and the bottom wall can be a continuation of the side wall. The bottom wall is shown in FIGS. 2-4 in its pushed-in condition which it assumes after the molded product is ejected from the mold and while it functions as a container for the molded product. The cavity is formed in the plastic sheet by vacuum forming, e.g., plug assist vacuum forming, or other suitable methods.

The bottom wall 19 includes a generally frusto-conical inverting portion 20 and a generally dome-shaped central portion 21. The inverting portion 20 extends inwardly and upwardly from the bottom edge 22 of the side wall to a circular edge 23 which joins the inverting portion 20 and the central portion 21. The central portion 21 is convexly shaped toward the bottom edge 22 and concavely shaped toward the flange 16. Recesses or ridges 24 extend downwardly from the central portion for molding the embossed design 13 on the product. As described in the foregoing United States patents, the central portion could be formed with a variety of upwardly or downwardly extending recesses, ridges, peaks, and/or valleys for molding any desired embossed and/or engraved design on the product. The term "ridges" as used herein broadly refers to any variation in the surface which produces a design on the product.

Figure 5:
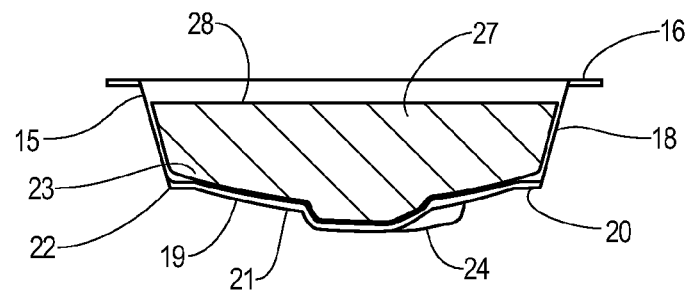
FIG. 5 is a sectional view of the mold with the bottom wall in its outer position and the mold filled with liquid food product.

The inverting portion 20 can be inverted back and forth between its pushed-in or inverted position illustrated in FIG. 4 and its pushed-out or non-inverted position illustrated in FIG. 5. When the mold 15 is originally formed, the bottom wall has the shape shown in FIG. 5. The original or as-molded position of the inverting portion 20 is thus the non-inverted position of FIG. 5. The inverting portion can be moved in either direction by exerting an appropriately directed pushing or pulling force on the inverting portion and/or the central portion 21.

In the preferred embodiment, the inverting portion 20 snaps, or moves "over-center," when it moves between the non-inverted or pushed-out position of FIG. 5 and the inverted or pushed-in position of FIG. 4. It is believed that the over-center movement is accommodated by outward flexing of the frusto-conical side wall 18, and/or flexing of the inverting portion 20, and/or flexing of the central portion 21 of the bottom wall. As a result of the over-center movement of the inverting portion 20 and the rigidity and resilience of the mold material, the inverting portion will remain in its pushed-out or pushed-in condition until it is forcibly moved to the other position.

The material of the mold has sufficient flexibility to permit the over-center movement of the inverting portion and also has sufficient resilience and rigidity so that the inverting portion and the central portion of the bottom wall will retain either the pushed-in or pushed-out position. In both the pushed-in and pushed-out condition, the inverting portion 20 is generally frusto-conical in shape. The resilient side wall 18 returns to its original position after the inverting portion moves over center.

FIG. 5 illustrates the mold with the bottom wall in its non-inverted or pushed-out condition. The frusto-conical inverting portion 20 extends generally radially inwardly and preferably slightly downwardly from the bottom edge 22 of the side wall 18 to the edge 23 of the central portion 21.

When the mold is in the non-inverted or pushed-out configuration of FIG. 5, the mold cavity is filled with a liquid food product 27. If the product is butter or margarine, the procedure described in U.S. Pat. No. 3,798,335 is advantageously used. The top surface 28 of the filled product is below the flange 16 so that the mold can later serve as a container when the mold is in its pushed-in configuration.

After filling, the product is allowed to solidify in the mold. If the product is butter or margarine, the product is refrigerated or frozen, preferably frozen. Other food products can be solidified at higher temperatures, for example, room temperature.

Figure 6:
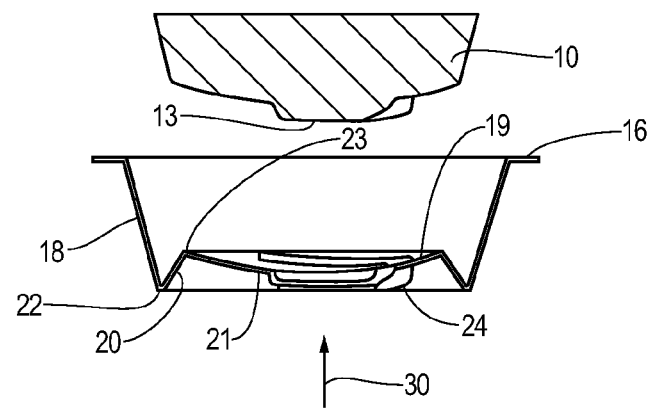
FIG. 6 illustrates the bottom wall being punched to its pushed-in position and the food product being ejected from the mold.

FIG. 6 illustrates the molded, solid food product 10 being ejected from the mold. A punching or pushing force 30 is applied to the bottom wall 19 to move the central portion 21 upwardly and to invert the inverting portion 20. The punching or pushing force may be exerted by a finger or thumb or may be exerted mechanically. The punching or pushing force is preferably exerted on the inverting portion 20 or at the edge 23 between the inverting portion 20 and the central portion 21 of the bottom wall.

As the central portion 21 moves upwardly and the inverting portion 20 inverts, the product 10 is moved away from the central portion 21 and is ejected from the ridges or recesses 24 of the mold. If the temperature of the food product is within an appropriate range, depending upon the nature of the product, the product will be ejected with the design 13 intact. The ejection of the product 10 from the mold is exaggerated in FIG. 6 for clarity of illustration. The product 10 need not be completely ejected from the mold as shown in FIG. 6. The product is merely pushed upwardly sufficiently to remove the embossed design 13 from the ridges/recesses 24 in the bottom wall of the mold.

Figure 7:
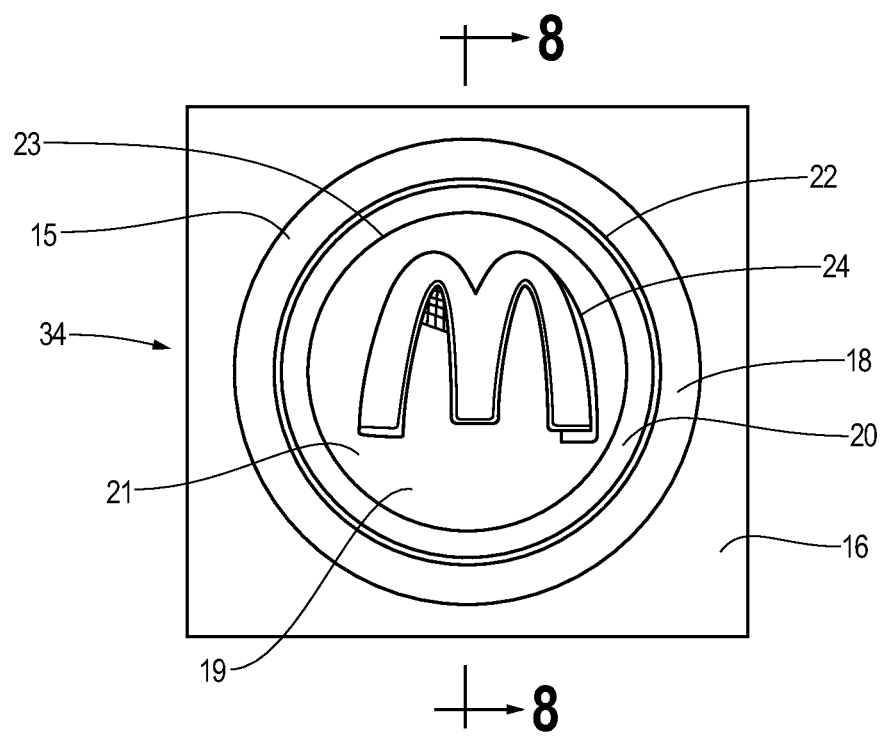
FIG. 7 is a top view of the package, consisting of the mold and the food product which is retained in the mold.
Figure 8:
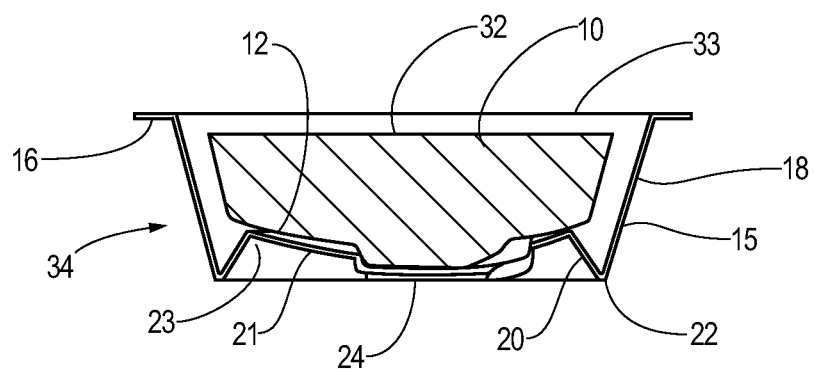
FIG. 8 is a sectional view taken along the line 8-8 of FIG. 7 which illustrates the completed package, with the food product inside the mold, the bottom wall in its pushed-in position, and a lid or film covering the food product and sealing the package.

Referring to FIGS. 7 and 8, after the molded food product 10 is ejected from the mold, the food product remains in, or is reinserted into, the mold while the mold remains in its pushed-in condition. The top surface 12 of the food product is supported by the edge 23 between the inverting portion 20 and the central portion 21 so that the embossed design 13 on the food product is spaced from the recesses/ridges 24 of the mold. The bottom surface 32 of the molded food product is spaced below the flange 16. The food product is sealed within the mold by a lid, cover, sheet, or film 33 which is removably attached to the flange 16, preferably by adhesive. The lid is advantageously formed from a plastic film such as DuPont's 50RL42 having a thickness of about 56 gauge.

The sealed package 34 comprising the mold 15 and the food product 10 can then be stored for later shipment to a customer. If the food product is butter or margarine, the package is preferably stored in a refrigerator or freezer and shipped in an insulated container which will maintain the product at the desired temperature.

The package can be shipped by orienting the package with either the bottom wall 19 down or the lid 33 down. Referring to FIGS. 4 and 8, when the mold is in its pushed-in position, the concave central portion 21 and the ridges 24 are preferably positioned at or above the bottom edge 22 of the side wall 18 so that the package is supported in a stable manner by the circular bottom edge 22. The molded food product is supported loosely within the cavity or pocket of the package by the pushed-in bottom wall 19, preferably by the circular edge 23.

The package 34 contains a single food product and is particularly suitable for individual sized servings, for example, a 0.2 ounce butter pat. However, the package can also be used for larger sizes of food products. Multiple packages 34 can be packaged within a shipping carton for shipment to a customer, for example, a fast food restaurant. The restaurant can distribute individual unopened packages 34 to the restaurant patrons. The package 34 is preferably served to the patron with the bottom wall 19 of the package facing up so that the ridges or recesses 24 present an aesthetically pleasing appearance. The patron opens the package by peeling the lid away from the flange 16, and tips the product onto a plate or the like so that the embossed design 13 faces upwardly.

Although the particular bottom wall 19 of the mold which is illustrated in the drawings includes an inverting portion 20, other ways of inverting the bottom wall and ejecting the molded food product can be used. For example, the entire bottom wall can be dome-shaped or concavely curved downwardly away from the flange 16. The concave bottom wall can be inverted or reversed by pushing the bottom wall into an inverted convex shape which curves upwardly toward the flange 16.

In the preferred embodiment, molds 15 are used individually to package the molded food product. However, multiple molds could be formed in a single sheet for molding multiple food products. The sheet could then be cut into individual molds for packaging the food products, or the sheet could remain intact for packaging multiple food products.

A sheet containing multiple mold cavities may advantageously be punched in-line in a continuous process as the sheet is moved out of a freezer. The sheet may be advanced from the freezer to a punching station where mechanical punches eject multiple food products from multiple mold cavities. A plate may be positioned above the mold cavities to prevent the food products from being ejected completely out of the mold cavities. The sheet of mold cavities may thereafter be advanced to a sealing station which applies a lid or cover to the mold cavities to seal the food products.

Figure 9:
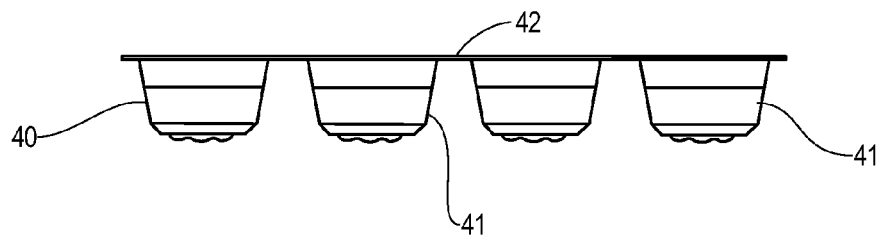
FIG. 9 is a side view of an eight cavity mold for molding eight individual food products.
Figure 10:
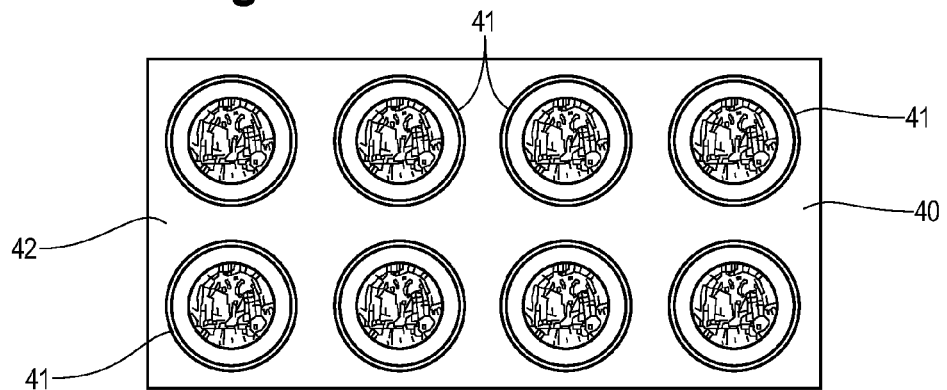
FIG. 10 is a bottom view of the mold of FIG. 9.

FIGS. 9 and 10 illustrate an eight cavity mold 40 for molding eight embossed food products such as butter or margarine pats. The eight cavity mold 40 includes eight mold cavities 41, and each individual mold cavity 41 is formed is substantially the same way as the mold 15. The eight cavity mold 40 is advantageously plug assist vacuum formed from a sheet 42 of PETG having a thickness of 0.015 inch. Similar molds can be made with any desired number of mold cavities, e.g., 20, 40, 60, etc. A greater number of mold cavities facilitates commercial production and packaging of the molded food products.

Figure 11:
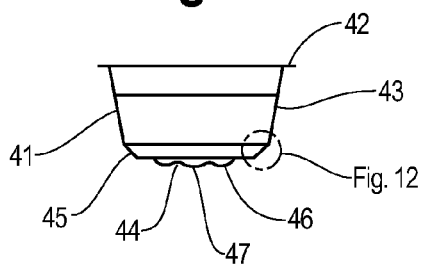
FIG. 11 is a fragmentary side elevational view of one of the mold cavities of FIG. 9.

FIG. 11 illustrates one of the molds 41 of the eight cavity mold 40. Each mold 41 includes a frusto-conical side wall 43, and a bottom wall 44. The bottom wall includes a frusto-conical inverting portion 45 and a generally dome-shaped central portion 46. The central portion 46 includes recesses or ridges 47 for molding an embossed design on the food product.

Figure 12:
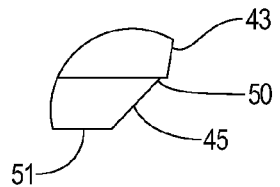
FIG. 12 is an enlarged fragmentary view of the inverting portion of the bottom wall of the mold cavity of FIG. 11.

Referring to FIG. 12, the frusto-conical inverting portion 45 extends downwardly and inwardly from an annular shoulder 50 which extends inwardly from the frusto-conical side wall 43. A second inwardly extending annular shoulder 51 extends inwardly from the inverting portion 45 to the dome-shaped central portion 46.

Figure 13:
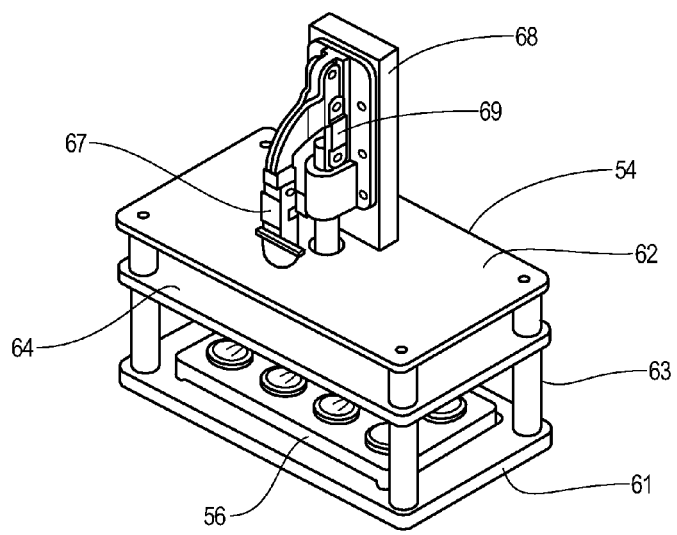
FIG. 13 is a perspective view of a punch fixture for punching or inverting the bottom walls of the eight cavity mold of FIG. 9.
Figure 14:
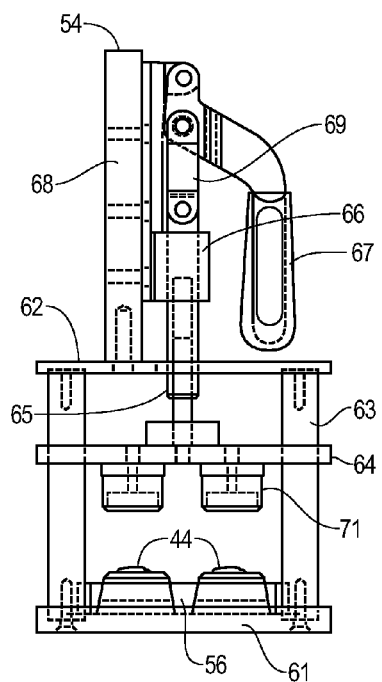
FIG. 14 is a side elevational view of the punch fixture.
Figure 15:
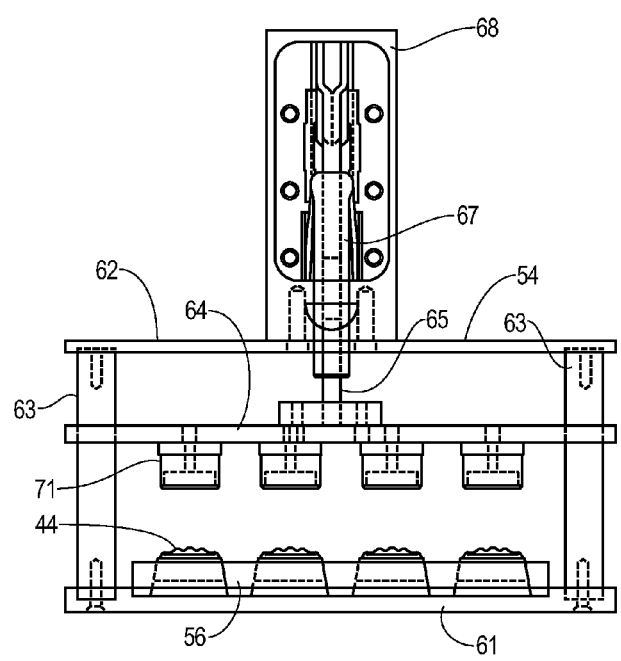
FIG. 15 is a front elevational view of the punch fixture.

FIGS. 13-15 illustrate a mechanical punch fixture 54 for mechanically inverting or punching the eight bottom walls 44 of the eight molds 41 of the eight cavity mold 40. During the punching step, the frusto-conical side wall 43 of each of the molds 41 is supported by a locator block 56.

Figure 19:
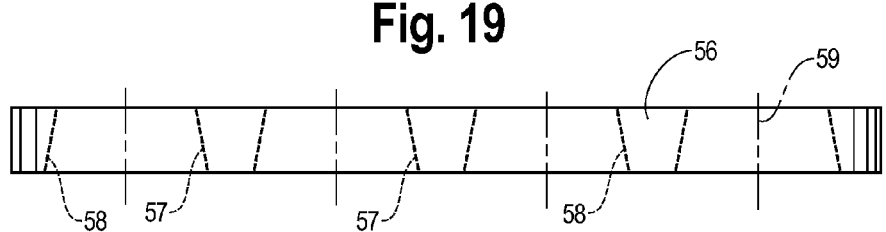
FIG. 19 is a side view of a locator block for holding the eight cavity mold of FIG. 9 during punching.
Figure 20:
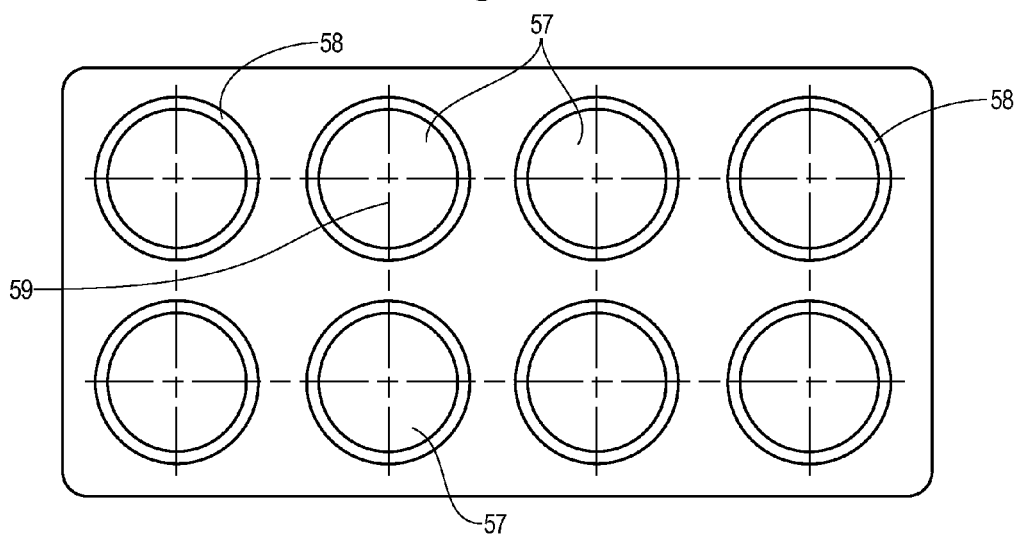
FIG. 20 is a bottom plan view taken along the line 20-20 of FIG. 19.

Referring to FIGS. 19 and 20, the locator block 56 includes eight openings 57, one for each of the molds 41. Each opening 57 is provided by a frusto-conical surface 58 which has substantially the same shape as the frusto-conical side walls 43 of the molds 41. In the embodiment illustrated, each surface 58 is angled at 10 degrees from the vertical axis 59 of the opening. The height of the locator block is less than the height of the side walls 43 of the molds 41 so that the upper portion of each side wall extends slightly above the top of the locator block as illustrated in FIGS. 14 and 15. The locator block is advantageously formed from Delrin.

The punch fixture 54 includes a base plate 61 for supporting the locator block 56 and a top plate 62 which is supported by four vertical rods 63. The rods may be attached to the plates 61 and 62 by screws. A punch plate 64 is slidably mounted on the rods 63 and can be reciprocated by a piston 65 which extends vertically through the top plate 62. The upper end of the piston 65 is slidably mounted in a bushing 66. A handle 67 is pivotally mounted on a support bracket 68 which is mounted on the top plate 62. A link 69 is pivotally connected to the handle 67 and the piston 65 so that pivoting movement of the handle reciprocates the piston 65 and the punch plate 64.

Although the punch plate 64 is manually reciprocated by the handle 67, other conventional and well known devices for mechanically reciprocating the punch plate can be used. For example, the punch plate can be reciprocated by a hydraulic cylinder and piston, a ball screw actuator, or the like.

Figure 16:
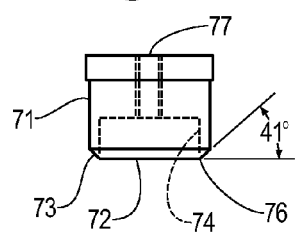
FIG. 16 is a side elevational view of one of the punches of the punch fixture.
Figure 17:
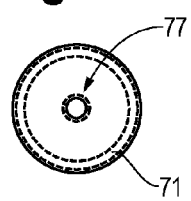
FIG. 17 is a top view taken along the line 17-17 of FIG. 16.
Figure 18:
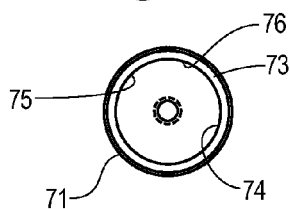
FIG. 18 is a bottom view taken along the line 18-18 of FIG. 16.

Eight punches 71 are mounted on the punch plate 64 in alignment with the openings 57 in the locator block 56. Referring to FIGS. 16-18, each punch 71 includes a bottom end 72 which is provided with a frusto-conical side wall 73 and a cylindrical counterbore 74 which extends upwardly from the bottom end. The side wall 73 and the cylindrical side surface 75 of the counterbore form a circular bottom edge 76. A bolt opening 77 extends through the top of the punch for attaching the punch to the punch plate 64.

In one specific embodiment, the diameter of the counterbore 74 was 1.0 inch, and the angle of the frusto-conical side wall 73 relative to the vertical was 41 degrees. As will be explained more fully hereinafter, the diameter of the bottom edge 76 of each punch is sized to engage the inverting portion 45 of one of the molds 41

The molds 41 are filled with food product as previously described with respect to the mold 15, and the product is allowed to solidify, e.g., by freezing. The eight cavity mold 40 is then placed in the locator block 56 so that the embossed bottom walls 44 of the molds 41 extend upwardly through the openings 57 in the locator block and the side walls 43 of the molds 41 are supported on the outside by the surfaces 58 of the openings 57 in the locator block.

The molds 41 are then punched by lowering the punch plate 64 and the punches 71 so that the circular bottom edges 76 of the punches engage the inverting portions 45 of the molds 41. As the punches continue downward, the inverting portions 45 are moved over-center from their pushed-out condition illustrated in FIGS. 11 and 12 to their pushed-in condition (see FIGS. 4 and 6). The portions of the side walls 43 of the molds which extend upwardly beyond the locator block 56 flex outwardly to permit the over-center movement of the inverting portions. As the inverting portions 45 invert or move downward, the food products within the molds 41 are ejected from the molds onto the base plate 61. The food products are then returned to the pushed-in molds, and a lid is secured to the sheet 42 over the food products to seal the food products within the molds as previously described with respect to FIGS. 6-8.

If desired, the lid can be attached to the sheet 42 before the products are punched from the molds to eliminate the labor of replacing the products in the molds. There is sufficient space in the molds between the sheet and the pushed-in position of the top of the molds to allow for ejection of the products after attaching the lid.

The mold 40 and the products which are packaged within the molds 41 can then be stored and shipped as previously described. Alternatively, individual molds 41 and the products therein, or a strip of molds 41 and products therein, can be cut from the mold 40.

The molds 41 are oriented in FIGS. 13-15 so that the bottom walls 44 face upwardly and are punched downwardly. However, the punch fixture can also be arranged so that the bottom walls are punched upwardly as illustrated in FIG. 6.

While in the foregoing specification a detailed description of specific embodiments was set forth for the purpose of illustration, it will be understood that many of the details described herein may be varied considerably by those skilled in the art without departing from the spirit and scope of the invention.

We claim:

1. A packaged food product comprising:
   a generally flat flange,
   a pocket extending from said flange, said pocket including a side wall portion which extends from said flange, an inverted wall portion which extends inwardly from the side wall portion and toward said flange, and a central wall portion which extends from said inverted wall portion, said central wall portion having a plurality of ridges which form a design in said central wall portion,
   a solid food product within said pocket, said food product having a surface with a plurality of ridges which correspond to the ridges in said central wall portion and which form a design on the solid food product, and
   a lid attached to said flange for enclosing said food product in said pocket to form the packaged food product,
   wherein the inverted wall portion is movable from a non-inverted to an inverted position, said movement being used to release the ridges of the food product from the ridges in the central wall portion, and the pocket and solid food product being sized such that the solid food product lies below the generally flat flange when the inverted wall portion is in the inverted position and the solid food item resides within the pocket.

2. The packaged food product of claim 1 in which said lid is removably attached to said flange whereby the lid can be detached from said flange and said food product can be removed from said pocket.

3. The packaged food product of claim 1 in which said lid is adhesively attached to said flange.

4. The packaged food product of claim 1 in which said ridges in said central portion extend away from said flange and said ridges on the surface of said food product are raised to provide an embossed design.

5. The packaged food product of claim 1 in which said pocket is formed from plastic having a thickness within the range of about 0.008 to about 0.025 inch.

6. The packaged food product of claim 5 in which said plastic is PETG.

7. The packaged food product of claim 1 in which said pocket is formed from PETG having a thickness of about 0.015 inch.

8. The packaged food product of claim 1 wherein the inverted wall portion lies in an over-centered condition relative to the central portion when the inverted wall portion is in the inverted position.

9. A packaged food product comprising:
a mold defining a cavity and having a central portion closing one end of the cavity and a flexible portion coupled to the central portion and flexible between first and second positions corresponding to a movement of the central portion into the cavity,
a solid food product formed in the mold against the central portion, and
wherein movement of the central portion into the cavity by the flexing of the flexible portions between the first and second positions, unseats the solid food product from the mold, and the mold and solid food product are sized such that the solid food product resides completely within the cavity when the flexible portion is in the second position.

10. The packaged food product according to claim 9 further comprising ridges on the central portion and the solid food product has complementary ridges.

11. The packaged food product according to claim 9 further comprising a lid provided on the mold to close the cavity.

12. The packaged food product according to claim 11 wherein the solid food product lies below the lid when the flexible portion is in the second position.

13. The packaged food product according to claim 9 wherein the mold cavity further comprises a peripheral wall circumscribing the central portion.

14. The packaged food product according to claim 13 wherein the peripheral wall has an upper extent forming an opening to the cavity.

15. The packaged food product according to claim 14 further comprising a flange extending from the upper extent of the peripheral wall.

16. The packaged food product according to claim 15 further comprising a cover mounted to the flange and closing the opening.

17. The packaged food product according to claim 13 wherein the flexible portion comprises an invertible portion coupling the central portion to the peripheral wall, and moveable between a non-inverted position and an inverted position corresponding to the first and second positions, respectively.

18. The packaged food product according to claim 17 wherein the inverted position defines an over-center position between the invertible portion and the central portion.

19. The packaged food product according to claim 9 wherein the second position defines an over-center position between the flexible portion and the central portion.

* * * * *